Sept. 22, 1964  A. J. TAMBURRO  3,149,997
LOW TEMPERATURE PRESSURE SENSITIVE ADHESIVE TAPE
Filed Jan. 17, 1962
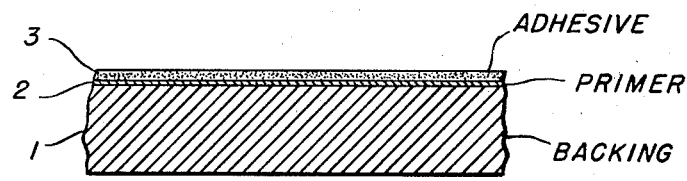
INVENTOR
ANTHONY J. TAMBURRO
BY
ATTORNEY

United States Patent Office 3,149,997
Patented Sept. 22, 1964

3,149,997
LOW TEMPERATURE PRESSURE SENSITIVE
ADHESIVE TAPE
Anthony J. Tamburro, Broomall, Pa., assignor to H. K. Porter Company, Inc., Pittsburgh, Pa., a corporation of Delaware
Filed Jan. 17, 1962, Ser. No. 166,900
2 Claims. (Cl. 117—76)

This invention relates to pressure sensitive adhesive compositions and more particularly to adhesives suitable for coating flexible and elastic backings in the manufacture of pressure sensitive adhesive tape capable of retaining their tackiness over a wide range of temperatures especially those below freezing.

Flexible backing for electrical tape is usually polyvinyl chloride about .008" to about .0095" in thickness and is coated with adhesive before being formed into rolls and then cut to tape width and it is essential not only that the adhesive retain its tackiness at low temperatures but also that it adhere to that face of the backing to which it is applied in preference to the other face which it contacts when the tape is in rolled condition.

Adhesives which are pressure sensitive at normal temperatures and comprising a curable elastomeric polymer, a liquid tackifier and an aldehyde resin curing agent have been used and examples of specific formulae for compounding them are set forth in U.S. Patent 2,999,769.

Such adhesives, however, lose their tackiness, essential to pressure sensitive adhesive tape, whatever be the character of the backing employed, when subjected to temperatures appreciably below freezing, and more especially at 0° F. and below and tapes made with them therefore cannot be used satisfactorily out-of-doors in cold weather.

However, my novel composition, which is an improvement on the adhesives of said patent, while utilizing certain of the components mentioned therein includes other agents modifying the properties of such components when combined therewith in such manner that a pressure sensitive adhesive tape can be produced which is adapted for insulating electric conductor splices at temperatures below 0° F. and, depending on the degree of flexing of the splice, effectively retains its excellent dielectric characteristics at those as low as −60° F.

It is therefore a principal object of the present invention to provide an improved adhesive particularly adapted for use in pressure sensitive tape which is effective not only at normal room temperature and above but also retentive of its pressure sensitive adhesive characteristics at extremely low temperatures such as those encountered in winter weather.

Another object is to provide a low temperature pressure sensitive adhesive which when applied to a suitable backing and the latter then wound into a roll with the adhesive contacting an adjacent convolution in the roll it can be unwound at any temperature within a wide range without separation of the adhesive from that face of the backing to which it was originally applied.

A further object is to prepare a pressure sensitive adhesive tape which at temperatures in the range including 0° F. and lower is substantially as effective for its intended purposes as it is at higher ones.

A still further object is to provide a pressure sensitive adhesive effective throughout the temperature range from 325° F. to below 0° F.

Other objects, purposes and advantages of the invention will hereinafter more fully appear or will be understood from the following description of a preferred procedure for compounding the adhesive composition contemplated thereby and producing pressure sensitive tape therefrom from which it will be apparent that while said composition is particularly suited for application to a polymeric plasticized polyvinyl chloride backing in the manufacture of electrical insulating tape it is adapted as well for many other associations in which a pressure sensitive adhesive effective over a wide range of temperatures may appropriately be employed.

For compounding the adhesive the ingredients in the proportions by weight indicated in the following table are brought together in a manner later described, the permissible range of parts by weight stated after some of them affording opportunity for modifying certain of the properties of the ultimate adhesive as will be hereinafter more fully explained.

| Commercial designation | Parts by weight | Percent by weight | Range in parts by weight |
|---|---|---|---|
| (1) Uncured rubber | 60 | 31.05 | 50–75 |
| (2) GR–S 1504 | 40 | 20.70 | 25–50 |
| (3) M–500 | 5 | 2.59 | 3–8 |
| (4) 2246 | 3 | 1.55 | 3–4 |
| (5) 325 W–G | 8 | 4.14 | |
| (6) Piccolyte S–115 | 2 | 1.03 | 1–4 |
| (7) SP 126 | 4 | 2.07 | 2–15 |
| (8) Vultac #3 | 2 | 1.03 | 2–4 |
| (9) Staybelite Ester 3 | 1 | 0.52 | 1–3 |
| (10) TP 90 B | 2 | 1.03 | 1–3 |
| (11) Hylene M | 0.25 | .13 | 0.10–0.50 |
| (12) Dow-Corning 274 | 3 | 1.56 | 2–3 |
| (13) Piccolyte S–70 | 48 | 24.84 | 10–50 |
| (14) Staybelite Ester 10 | 15 | 7.76 | 7–15 |
| | | 100.00 | |

(1) The uncured rubber employed for item (1) may be natural rubber such as commercial ribbed smoked sheets, pale crepes or the like readily available in the market.

(2) GR–S 1504, a styrent butadiene copolymer with 12% bound styrene as marketed by Naugatuck Chemical Co., Naugatuck, Conn., functions as a plasticizer and promotes the "quick-stick" properties of the adhesive; it also tends as the quantity of it present is increased to lower viscosity.

(3) M–500 is reclaimed natural rubber as supplied by Midwest Rubber Reclaiming Co., East St. Louis, Illinois. Its function is primarily to impart a black coloration to the adhesive and improve solubility and workability of the other ingredients during milling.

(4) 2246 is 2-2 methylene bis (4 methyl 6 tertiary butyl phenol) marketed as Calco 2246 by American Cyanamid Co. or under the designation CAO–5 by Catilin Corporation of America. It is a non-staining, non-discoloring antioxidant in the form of a light colored powder; other suitable antioxidants may be substituted for it in comparable quantity.

(5) 325 W–G, a −325 mesh platy water ground mica obtainable from English Mica Co., is a white powder which functions to decrease adhesion at low temperatures and thus promotes unwinding of the tape from a roll without delamination of the adhesive from its backing.

(6) Piccolyte S–115, a polyterpene resin of about 115° C. (239° F.) melting range, is obtainable as an amber colored solid from Pennsylvania Industrial Chemical Corp., Clairton, Pa. It assists in developing good room temperature tack and adhesion.

(7) SP 126 is heat reactive carboxylated alkyl phenolic resin, such as alkyl phenol formaldehyde resin supplied as a dark amber transparent solid by Schenectady Varnish Co., Schenectady, N.Y. It imparts heat resistance to the adhesive and also improves low temperature serviceability of the latter by countering the tendency of the elastomers to soften through depolymerization on aging.

(8) Vultac #3, an alkyl phenol disulfide available from Pennsalt Chemicals Corp., Philadelphia, Pa., is a dark brown solid resin which tends to promote low level cure of the composition and improves tack.

(9) Staybelite Ester 3 is a dark amber viscous liquid comprising primarily the triethylene glycol ester of hydrogenated wood rosin as supplied by Hercules Powder Co., Inc., Wilmington, Delaware. It functions as a tackifier and improves release of the tape from a roll without delamination at room temperatures.

(10) TP 90 B is a high molecular weight polyether supplied by Thiokol Chemical Corp., Trenton, N.J., and is effective as a plasticizer promoting flexibility at low temperatures. It is a light amber liquid approximately corresponding to

$C_4H_9OC_2H_4OC_2H_4OCH_2OC_2H_4OC_2H_4OC_4H_9$

(11) Hylene M, or methylene bis (4 phenol isocyanate), a straw colored crystalline solid supplied by E. I. du Pont de Nemours & Co., Inc., Wilmington, Del., promotes low level cure and the physical smoothness of the mass.

(12) Dow-Corning 274 is a silicone based substance supplied by Dow-Corning Corp., Midland, Michigan. It is usually procured in solution in xylene at about 60% total solids and used in that form, the xylene normally being vaporized and thus discharged from the mass during milling and the silicone functioning as a general low temperature plasticizer. Low temperature tack is impaired if an excess of this ingredient is used.

(13) Piccolyte S-70, a polyterpene resin light amber in color, also obtainable from Pennsylvania Industrial Chemical Corp., tends to promote tackiness and is thus primarily a tackifier, having a melting range about 70° C. (158° F.).

(14) Staybelite Ester 10, also supplied by Hercules Powder Co., is a glycerol ester of hydrogenated wood rosin.

To prepare the adhesive, using these ingredients, the rubber (1) and Hylene M (11) are milled together in a Banbury mill for two minutes during which the isocyanate of the Hylene M combines chemically with the rubber, giving off $CO_2$ as a gas which escapes. The GR-S 1504 (2) and M-500 (3) are then added and the milling continued for two minutes more before the 2246 (4), 325W-G (5), Piccolyte S-115 (6), SP 126 (7), Vultac #3 (8) and TP 90 B (10) are added. Chemical reaction and the internal friction generated by the mill combine to bring the temperature of the mass to 300° F. or higher during the ensuing five minutes while most of the SP 126 (7) is reacting with the Vultac #3 (8). A portion of the former remains unreacted temporarily, however, as will hereinafter appear, and after the expiration of approximately said period the mass is discharged from the mill, cooled and mixed with the Staybelite Esters 3 and 10 (9) and (14), the Dow-Corning 274 (12) and Piccolyte S-70 (13) in a quantity of heptane $(CH_3(CH_2)_5CH_3)$ sufficient to produce a viscous fluid containing about 30% total solids, although depending on the viscosity desired the solution may contain total solids of from 27% to 32%.

Before coating a polyvinyl chloride or other backing with this solution it is preferable the surface of the backing be lightly treated with a primer such as Resyn 76–4798 supplied by National Starch Chemical Corp., New York, N.Y., believed to be a vinyl acrylic copolymer usually employed in solution with a volatile organic solvent, 0.10 oz. dry weight of this material per square yard of the backing being adequate to prevent delamination. Any suitable coating apparatus may be used for this treatment and thereafter applying the solution of which a quantity sufficient to provide a coating from .00075″ to 0.002″ thick after drying should be used, a dry thickness of about 0.001″ being preferred. The coated backing is then passed through a drying oven in which it is heated by stages to a maximum temperature of 250° F.; it is preferably passed through the oven in about three minutes and subjected to said maximum temperature for but about 30 seconds. The drying operation volatilizes the heptane the boiling point of which is just below that of water, and the residual deposit of flexible, elastic, tacky adhesive remains adherent to the backing which is then preferably passed over a cooling drum and wound into a roll preparatory to being severed into individual rolls of relatively narrow tape.

Reference has been made to the reaction of SP 126 (7) in the mill during compounding of the adhesive and to the fact that some of it remains temporarily unreacted. This retention of SP 126 in an unreacted state is of importance due to the tendency of polymerized elastomers to depolymerize on aging and thereby become unduly soft. The unreacted carboxylated resin of SP 126 counteracts this tendency and thus greatly prolongs the serviceability of the tape.

Other properties of .0086″ polyvinyl chloride tape 1″ wide coated with about .001″ of the composition herein specifically set forth and in accordance with the procedures outlined include the following:

| | |
|---|---|
| Adhesion to backing @ 23° C. (73.4° F.) | 1.14 lb. |
| Adhesion to backing @ −18° C. (−0.4° F.) | 4.5 lb. |
| Adhesion to backing steel @ 23° C. (73.4° F.) | 1.24 lb. |
| Unwind @ −18° C. (−0.4° F.) | 5.11 lb. |
| Breaking strength initial | 21.7 lb. |
| Breaking strength after aging [1] | 91.0% retained. |
| Elongation initial | 226.0%. |
| Elongation after aging [1] | 89.9% retained. |
| Load at 50% initial | 17.6 lb. |
| Load at 50% after aging [1] | 99.6% retained. |
| Dielectric strength | 9,100 volts. |
| Dielectric strength after immersion | 8,510 volts. |
| Insulation resistance | $1.17 \times 10^{10}$ megohms. |
| Penetration | 141.5° C. |
| Copper corrosion | None. |
| Telescoping | None. |

[1] @ 100° C. for 48 hours.

The tape can be readily unwound from its roll at temperatures from −20° F. to 300° F., and after conditioning for nine months at 0° F. exhibits no substantial change in its properties, remaining flexible, with good tackiness and adherence to steel. In other tests exposure of the tape to 300° F. for ten hours had no noticeable effect while splices insulated with it subjected to 150° F. at 95% relative humidity for six months remained well insulated and in good condition.

As shown in the accompanying drawing the novel tape formed in accordance with this invention comprises a backing 1 having a primer coating 2 for anchoring a coating 3 of a normally tacky and pressure-sensitive adhesive.

While I have herein described my invention with considerable particularity I do not desire or intend to be limited or confined thereto or thereby in any way as changes in and substitution of equivalents of specific ingredients herein recited as well as in their relative proportions and in the procedures employed for bringing them together will readily occur to those skilled in the art and may be practiced without departing from the spirit and scope of the invention as defined in the appended claims.

Having thus described my invention I claim and desire to protect by Letters Patent of the United States:

1. A pressure-sensitive adhesive tape having the characteristic of retaining tackiness in its adhesive coating in the temperature range from about −20° F. to about 325° F. which comprises a flexible relatively non-porous backing film calendered from plasticized polyvinyl chloride resin coated on a primed major surface thereof with an adhesive containing in parts by weight approximately:

| | |
|---|---|
| Uncured natural rubber | 50–75 |
| Styrene butadiene copolymer containing 12% bound styrene | 25–50 |
| Reclaimed natural rubber | 3–8 |
| 2,2-methylene bis (4 methyl 6 tertiary butyl phenol) | 3–4 |
| 325 mesh platy water ground mica | 8 |
| Polyterpene resin of about 115° C. melting range | 1–4 |
| Heat reactive carboxylated alkyl phenolic resin | 2–15 |
| Triethylene glycol ester of hydrogenated wood rosin | 1–3 |
| High molecular weight polyether substantially of the formula $C_4H_9OC_2H_4OC_2H_4OCH_2OC_2H_4OC_2H_4OC_4H_9$ | 1–3 |
| Methylene bis (4 phenol isocyanate) | 0.10–0.50 |
| Silicone introduced as a solution of 60% total solids in xylene | 2–3 |
| Polyterpene resin | 10–50 |
| Glycerol ester of hydrogenated wood rosin | 7–15 |
| Alkyl phenol disulfide | 2–4 |

2. A pressure sensitive adhesive tape having the characteristic of retaining tackiness in its adhesive coating in the temperature range from about −20° F. to about 325° F. which comprises a flexible relatively non-porous backing film calendered from plasticized polyvinyl chloride resin coated on a primed major surface thereof with an adhesive containing in percent by weight approximately:

| | |
|---|---|
| Uncured natural rubber | 31.05 |
| Styrene butadiene copolymer containing 12% bound styrene | 20.70 |
| Reclaimed natural rubber | 2.59 |
| 2,2-methylene bis (4 methyl 6 tertiary butyl phenol) | 1.55 |
| 325 mesh platy water ground mica | 4.14 |
| Polyterpene resin of about 115° C. melting range | 1.03 |
| Heat reactive carboxylated alkyl phenol resin | 2.07 |
| Triethylene glycol ester of hydrogenated wood rosin | 0.52 |
| High molecular weight polyether substantially of the formula $C_4H_9OC_2H_4OC_2H_4OCH_2OC_2H_4OC_2H_4OC_4H_9$ | 1.03 |
| Methylene bis (4 phenol isocyanate) | .13 |
| Silicone introduced as a solution of 60% total solids in xylene | 1.56 |
| Polyterpene resin | 24.84 |
| Glycerol ester of hydrogenated wood rosin | 7.76 |
| Alkyl phenol disulfide | 1.03 |

References Cited in the file of this patent
UNITED STATES PATENTS

| | | |
|---|---|---|
| 2,491,477 | Chimiel | Dec. 20, 1949 |
| 2,643,285 | Rust et al. | Apr. 3, 1953 |
| 2,652,351 | Gerhardt | Sept. 15, 1953 |
| 2,711,132 | Viscardi | June 21, 1955 |
| 2,721,857 | Dickmann | Oct. 25, 1955 |
| 2,790,732 | McGarry et al. | Apr. 30, 1957 |
| 2,859,202 | Bobear | Nov. 4, 1958 |
| 2,886,467 | Lavanchen et al. | May 12, 1959 |
| 2,964,422 | Bergstedt et al. | Dec. 13, 1960 |
| 2,965,592 | Ethier et al. | Dec. 20, 1960 |
| 2,993,949 | Moebins et al. | July 25, 1961 |
| 2,999,769 | Korpman | Sept. 12, 1961 |
| 3,032,438 | Gaynes et al. | May 1, 1962 |
| 3,067,057 | Dabroski | Dec. 4, 1962 |

FOREIGN PATENTS

| | | |
|---|---|---|
| 150,069 | Australia | Feb. 16, 1953 |

OTHER REFERENCES

Kirk-Othmer: "Encyclopedia of Chemical Technology," vol. 13, p. 173 (FIG. 15), TP9E68.

Fisher: "Industrial and Engineering Chemistry," August 1939, pp. 942, vol. 31, No. 8, TPI.A58.

Kirk-Othmer: "Encyclopedia of Chemical Technology," vol. 1, pp. 199–202, TP9E68.